United States Patent [19]

Hanzawa

[11] Patent Number: 5,127,869
[45] Date of Patent: Jul. 7, 1992

[54] SOUND PRODUCING TOY

[75] Inventor: Tsuneo Hanzawa, Tokyo, Japan

[73] Assignee: K.K. Hanzawa Corporation, Tokyo, Japan

[21] Appl. No.: 761,265

[22] Filed: Sep. 17, 1991

[30] Foreign Application Priority Data

Oct. 23, 1990 [JP] Japan .................. 2-283430

[51] Int. Cl.⁵ .............................. A63H 5/00
[52] U.S. Cl. ................... 446/397; 446/409; 446/438; 434/169
[58] Field of Search ........... 446/409, 397, 297, 303, 446/175, 438, 410; 434/169, 308; 273/238, 288, 237, 239, 442

[56] References Cited

U.S. PATENT DOCUMENTS

| | | | |
|---|---|---|---|
| 2,002,358 | 5/1935 | Smith | 446/438 |
| 4,348,191 | 9/1982 | Lipsitz et al. | 446/297 X |
| 4,820,233 | 4/1989 | Weiner | 434/308 X |
| 4,993,983 | 2/1991 | Kurita et al. | 446/409 X |

FOREIGN PATENT DOCUMENTS 2151388  7/1985  United Kingdom ............... 446/410

Primary Examiner—Mickey Yu
Attorney, Agent, or Firm—Ladas & Parry

[57] ABSTRACT

A toy includes a board having a path and a plurality of animal figures drawn on the board along the path, and a toy sightseeing bus moved along the path. Electrically conductive members are formed on the path at positions opposing the animal figures for producing commands which specify the corresponding animals. A group of contacts are arrayed on the bottom of the toy bus in such a manner that the contacts come into sliding contact with the electrically conductive members. When the toy bus arrives at a position opposing an animal figure, a set of the contacts is closed selectively by the electrically conductive member corresponding to this animal figure so that the closed contacts generate a signal designating the animal. The toy bus is provided with a signal processing circuit for producing command signals corresponding to the animal figures by processing the signals from the group of contacts, and a memory for storing audio data representing a characterizing feature of each of the animals, such as the cry of the animal, the data being read out of the memory based upon the command signal from the signal processing circuit. The toy bus is further provided with a speaker for producing the cries of the animals based upon the data read out of the memory, and with a lamp caused to flash when the toy bus passes by each animal figure.

4 Claims, 3 Drawing Sheets

SOUND PRODUCING TOY

BACKGROUND OF THE INVENTION

1. Field of the Invention

This invention relates to a toy. More particularly, the invention relates to a toy having a teaching function in which objects to be observed, such as the figures of animals, are located at various points along a path provided on a board, add the characterizing features of the observed objects are capable of being expressed as by sound when a movable toy vehicle passes the positions of the objects.

2. Description of the Prior Art

Various educational toys through which children can be taught the characterizing features of observed objects such as animals are available. In one example known in the art, a variety of animal figures such as pigs, horses and cows are printed along an excursion path formed on a board, and a child is taught the names of the animals while the child pushes a toy vehicle serving as a sightseeing bus along the excursion path.

With this educational toy according to the prior art, the toy vehicle is merely moved along the excursion path by being pushed, there is no interaction between the moving toy vehicle and the animals to arouse the curiosity of the child, and the animals do not produce sound. As a consequence, the toy does not possess a teaching function through which the child can learn the names and distinctive cries of the animals while playing, and the manner of play is no different from that of an ordinary toy vehicle. Thus, the toy is not highly effective as a learning and educational aid for children.

SUMMARY OF THE INVENTION

Accordingly, an object of the present invention is to provide a toy having a teaching function capable of arousing the curiosity of children and of enhancing the teaching and educational effect.

According to the present invention, the foregoing object is attained by providing a toy which comprises a board having a path and a plurality of observed objects formed along the path; a movable body for moving along the path on the board; an electrically conductive member formed on the path at a position opposing each observed object for applying a command which specifies the observed object corresponding to the electrically conductive member; a group of contacts arrayed on a side of the movable body opposing the path in such a manner that the contacts come into sliding contact with the electrically conductive members, wherein when the movable body arrives at a position opposing an observed object, a set of the contacts is closed selectively by the electrically conductive member corresponding to this observed object so that the closed contacts generate a signal for designating this observed object; signal processing means for transmitting command signals corresponding to the observed objects by processing signals from the group of contacts; a memory for storing sound data and other data representing a characterizing feature of each of the observed objects, the data being read out of the memory based upon the command signal outputted by the signal processing means; and output means for outputting the characterizing features of the observed objects, in the form of sound or action, based upon the data read out of the memory.

When the movable body passes one of the electrically conductive members by being moved along the path, this electrically conductive member selectively closes one specified set of the contacts so that a signal which designates the corresponding observed object is sent to the signal processing means. Upon receiving the signal, the signal processing means reads the data conforming to the command signal out of the memory and transmits the data to the output means. As a result, the movable body outputs the characterizing feature of the corresponding object, such as the distinctive cry of the object if the object is an animal, in the form of audio. This makes it possible for a child to learn the characterizing features of the objects while playing.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

A preferred embodiment of the present invention will now be described in detail with reference to the accompanying drawings.

Figure 1A:
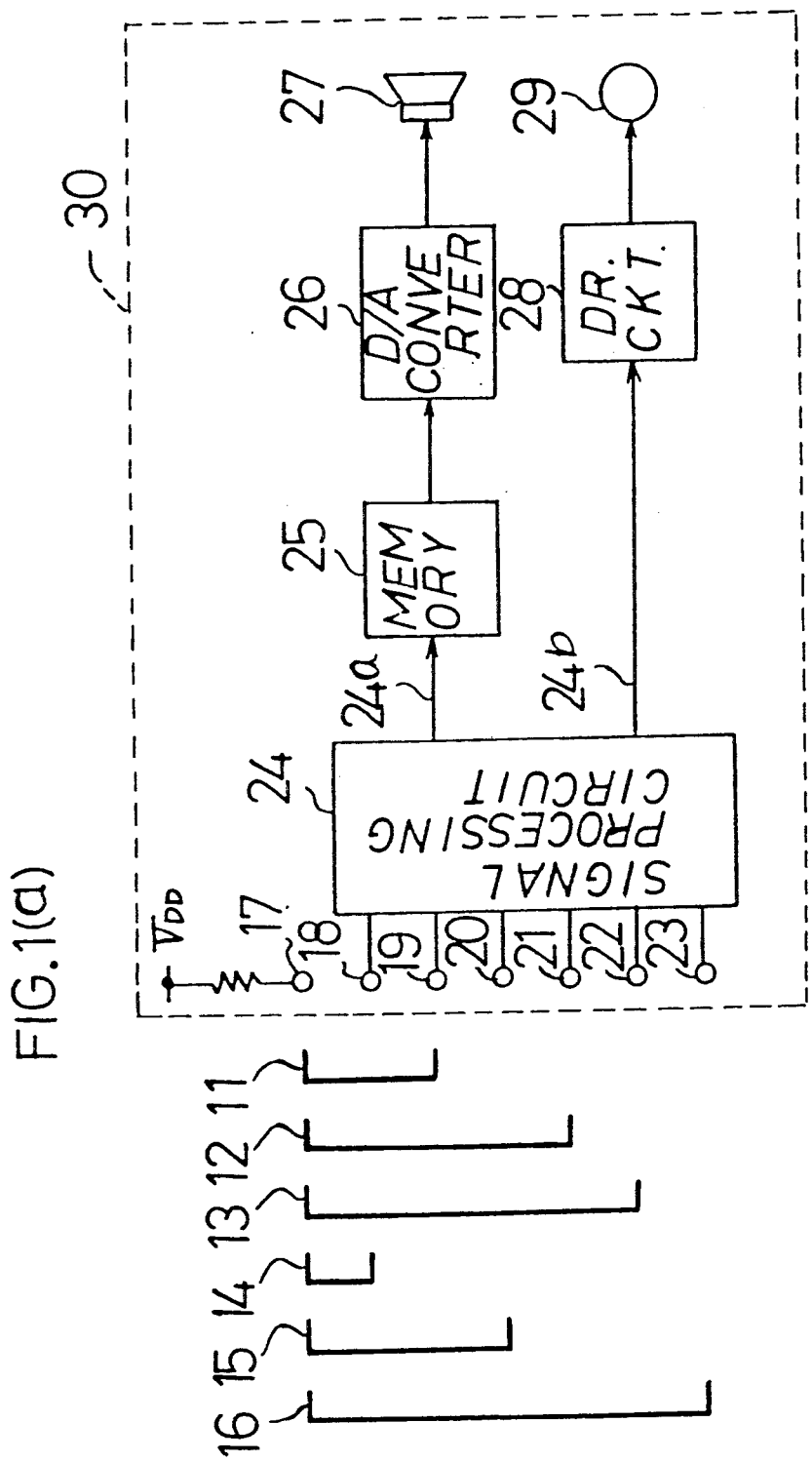
FIG. 1(a) is a block diagram illustrating an embodiment of a toy according to the present invention.
Figure 1B:
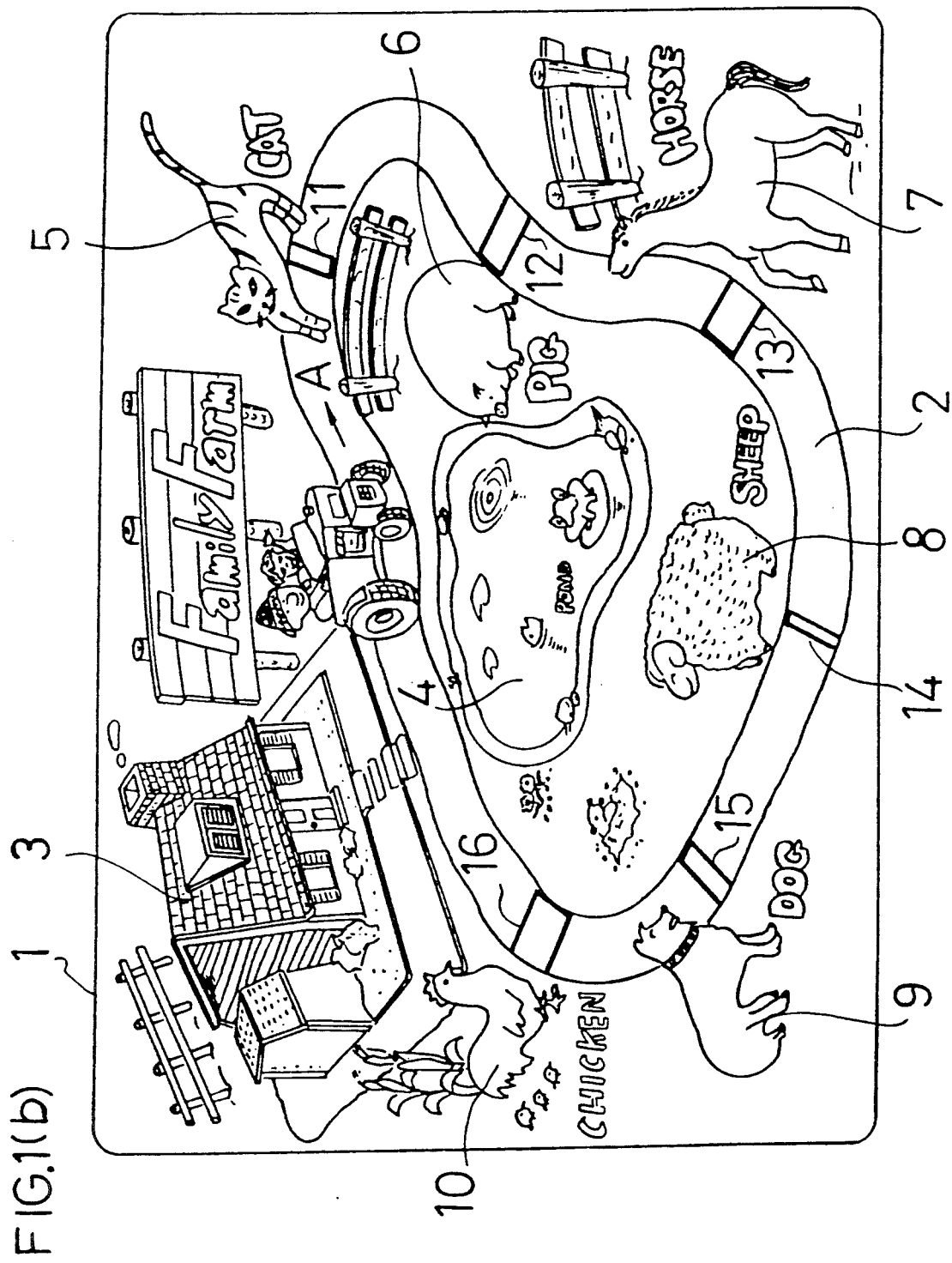
FIG. 1(b) is a plan view of a board according to the embodiment of the invention.
Figure 2:
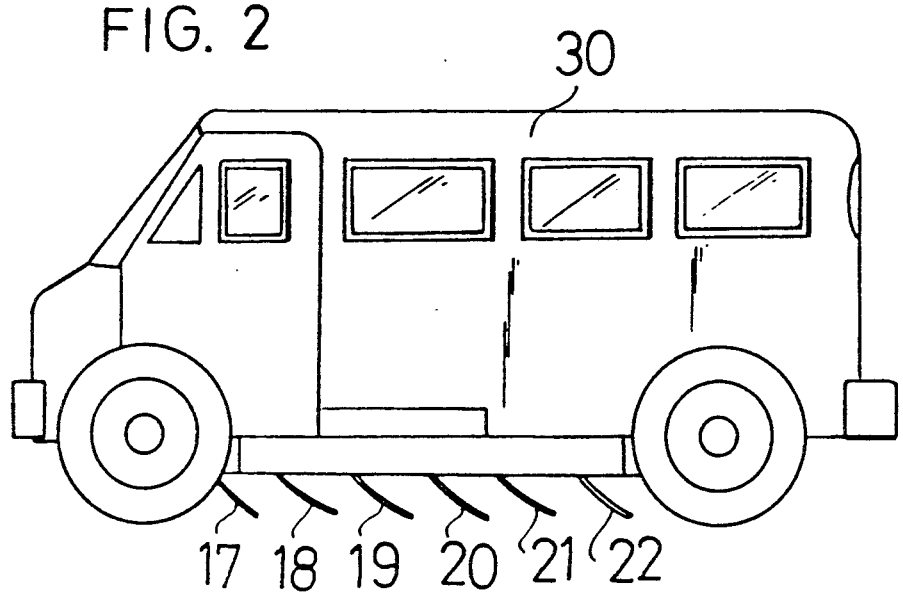
FIG. 2 is a side view illustrating a toy vehicle.
Figure 3:
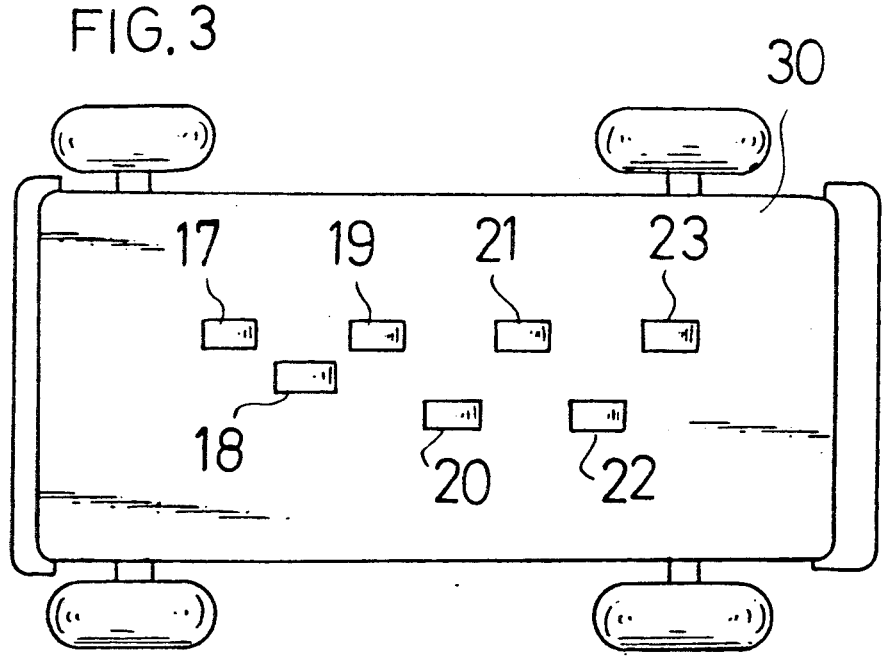
FIG. 3 is a bottom view of the toy vehicle.

FIGS. 1 through 3 illustrate an embodiment in which the present invention is applied to a toy for an excursion through a family farm.

As shown in FIGS. 1(a), (b), the toy embodying the present invention includes a play board 1 having a path 2 and a plurality of observed objects such as animals 5-10 formed along the path; a movable body 30 serving as a toy sightseeing bus for moving along the path 2 on the board 1; electrically conductive members 11-16 formed on the path 2 on the board 1 at positions opposing the observed animals 5-10 for applying commands which specify the corresponding animal; and a group of contacts 17-23 arrayed on a side of the toy sightseeing bus 30 opposing the path 2 in such a manner that the contacts come into sliding contact with the electrically conductive members 11-16. When the toy sightseeing bus 30 arrives at a position opposing one of the animals 5-10, the corresponding electrically conductive member selectively closes specific ones of the contacts 17-23 so that a signal for designating this animal is generated. The toy further includes a signal processing circuit 24 for transmitting command signals corresponding to the animals 5-10 by processing signals from the contacts 17-23; a memory 25 for storing sound data and other data representing a characterizing feature of each of the animals, the data being read out of the memory 25 based upon the command signal outputted by the signal processing circuit 24; and output means 27, 29 for outputting the characteristics of the animals, in the form of sound or action, based upon the data read out of the memory 25.

The foregoing will now be described in greater detail.

As shown in FIG. 1(b), the play board 1, which is a representative of a family farm, is made of thick paper or the like. The path 2, which serves as an excursion path in the form of an endless loop, a rest house 3 and a pond 4 are formed on the board by printing.

The aforementioned animals, such as a cat 5, a pig 6, a horse 7, a sheep 8, a dog 9 and a chicken 10, are printed on the board 1 along the path 2 and are objects to be observed. The conductive members 11-16, which are generally bracket shaped, are formed on the excursion path 2 transversely thereof as by a printing technique. Each conduction member applies a command specifying a specific animal. More specifically, the conductive members 11-16 have widths that differ from one another, thereby specifying the characterizing feature of the corresponding animal, such as its distinctive cry.

As shown in FIGS. 2 and 3, the contacts 17-23 are attached to the underside of the chassis of the toy sightseeing bus 30 so as to project therefrom. As illustrated in FIG. 1(a), the contact 17 is a common contact connected to a power supply $V_{DD}$, and the contacts 18-23 corresponding to the cow 8, cat 5, dog 9, pig 6, horse 7 and chicken 10, respectively, printed on the board 1.

When the toy sightseeing bus 30 is placed upon the board 1, the contacts 17-23 come into sliding contact with the surface of the board. The common contact 7 is short-circuited to specific ones of the other contacts 18-23 by those conductive members 11-16 having the corresponding widths.

The signal processing circuit 24 generates a memory address signal and an action signal based upon a signal which results when any of the contacts 18-23 is connected to the common contact 17 by a corresponding one of the bracket shaped electrically conductive members 11-16. The audio memory 25 stores the distinctive cries of the aforementioned animals and receives the address signal from the signal processing circuit 24 as an input signal thereto. The memory 25 is connected to a D/A converter 26, which converts the digital audio data read out of the addressed memory 25 into an analog quantity. The output side of the D/A converter 26 is connected to a speaker 27 which outputs the distinctive cries of the animals. A drive circuit 28 actuated by the action data is connected to the signal processing circuit 24. A lamp 29 caused to flash by the drive circuit 28 is connected thereto. The speaker 27 and lamp 29 constitute the aforementioned output means.

The circuitry shown in FIG. 1(a) is mounted within the toy sightseeing bus 30 shown in FIG. 2. A battery (not shown) for powering the circuitry, the speaker 27 and the lamp 29 also is mounted within the toy sightseeing bus 30.

In operation, the toy sightseeing bus 30 is placed upon the excursion path 2 formed on the board 1 representing a family farm, and the bus 30 is pushed along the path 2 by hand.

When the toy sightseeing bus being made to run in the direction of arrow A in FIG. 1(b) passes the electrically conductive member 11, for example, a current flows through the conductive member 11 when it contacts the common contact 17 and the contact 19 projecting from the underside of the chassis of the toy sightseeing bus 30. The resulting signal is supplied to the signal processing circuit 24. Upon receiving this signal, the signal processing circuit 24 outputs a corresponding address signal 24a and action signal 24b.

In response to reception of the address signal 24a, the audio memory 25 is addressed and the audio data stored at the addressed location is outputted to the D/A converter 26, whereby the digital audio data is converted into an analog audio signal, which is delivered to the speaker 27. As a result, the speaker 27 emits the crying sound of the cat 5, which corresponds to the electrically conductive member 11.

Meanwhile, the action signal 24b is delivered to the drive circuit 28, whereby the lamp 29 is caused to flash. This gives a visual indication to the child that the toy sightseeing bus 30 has passed the position at which the cat 5 is drawn.

Accordingly, the child not only is capable of playing with the toy sightseeing bus 30 but also is capable of learning the crying sound of the cat 5 while playing. Thus the toy of the present invention is educational and more fun to play with as well.

If the toy sightseeing bus 30 passes the electrically conductive member 12, a current passed through the latter when it contacts the common contact 17 and the contact 21 projecting from the toy sight-seeing bus 30, and the resulting signal is supplied to the signal processing circuit 24. Upon receiving this signal, the signal processing circuit 24 outputs the corresponding address signal 24a and action signal 24b.

In response to reception of the address signal 24a, the audio memory 25 is addressed and the audio data stored at the addressed location is outputted to the D/A converter 26, whereby the digital audio data is converted into an analog audio signal, which is delivered to the speaker 27. As a result, the speaker 27 emits the crying sound of the pig 6, which corresponds to the electrically conductive member 12. When the action signal 24b is delivered to the drive circuit 28, the lamp 29 is caused to flash and give a visual indication to the child that the toy sightseeing bus 30 has passed the position at which the pig 6 is drawn.

Further, when the toy sightseeing bus 30 passes the electrically conductive member 13, the common contact 17 and the contact 22 are closed by the conductive member 13 and, in accordance with an operating procedure similar to that described above, the speaker 27 produces the crying sound of the horse 7 and the lamp 29 flashes simultaneously. Similarly, when the toy sightseeing bus 30 passes the electrically conductive member 14, the common contact 17 and the contact 18 are closed by the conductive member 14 and, in accordance with an operating procedure similar to that described above, the speaker 27 produces the crying sound of the sheep 8 and the lamp 29 flashes simultaneously.

When the toy sightseeing bus 30 passes the electrically conductive member 15, the common contact 17 and the contact 20 are closed, whereby the speaker 27 produces the crying sound of the dog 9 and the lamp 29 flashes simultaneously. When the toy sightseeing bus 30 passes the electrically conductive member 16, the common contact 17 and the contact 23 are closed, whereby the speaker 27 produces the crying sound of the chicken 10 and the lamp 29 flashes simultaneously.

Thus, in the illustrated embodiment, whenever the toy sightseeing bus 30 pushed by hand along the excursion path 2 passes one of the electrically conductive members 11-16, the cry of the corresponding animal drawn on the board 1 is emitted from the speaker 27 and, at the same time, the lamp 29 is caused to flash so that the child can visually perceive the presence of the animal. As a result, the child is capable of learning the cries of various animals while playing, the toy has an enhanced educational effect and is more enjoyable.

Though a family farm is taken as an example in the embodiment described above, this does not impose a limitation upon the invention. The invention is applicable also to a safari, amusement park or zoo, and the sounds that can be produced may be those found in a child's environment, such as the sound of a clock, the sound of someone walking, the cries of insects, etc.

In addition, the movable body which travels along the path is not limited to a toy sightseeing bus, and the sounds produced by the speaker are not limited to the cries of animals or insects. The speaker can be made to produce the sound of music if desired.

Furthermore, the observed objects such as the animals formed on the board are not limited to the planar representations formed by printing; the objects can be three-dimensional if desired. Moreover, it goes without saying that the movable body is not limited to one pushed by hand but may be one which travels automatically.

Thus, in accordance with the present invention as described above, the arrangement is such that whenever a movable body which travels along a path on a board passes an electrically conductive member, a characterizing feature of an observed object corresponding to this electrically conductive member is indicated by sound or action. As a result, a child is capable of enjoying playing with the toy as a matter of course, and it is possible also for the child to learn a characterizing feature of each observed object while playing with the toy. Thus, the toy is capable of being utilized as a toy per se and also as an educational aid.

As many apparently widely different embodiments of the present invention can be made without departing from the spirit and scope thereof, it is to be understood that the invention is not limited to the specific embodiments thereof except as defined in the appended claims.

What is claimed is:

1. A toy which comprises:
   a board having a path and a plurality of observed objects formed along the path;
   a movable body for moving along the path on said board;
   an electrically conductive member formed on the path at a position opposing each observed object for applying a command which specifies the observed object corresponding to this electrically conductive member;
   a group of contacts arrayed on a side of said movable body opposing the path in such a manner that the contacts come into sliding contact with said electrically conductive members, wherein when said movable body arrives at a position opposing an observed object, a set of the contacts is closed selectively by said electrically conductive member corresponding to this observed object so that the closed contacts generate a signal for designating this observed object;
   signal processing means provided on said movable body for producing command signals corresponding to the observed objects by processing signals from said group of contacts;
   a memory provided on said movable body for storing data representing a characterizing feature of each of the observed objects, the data being read out of said memory based upon the command signal outputted by said signal processing means; and
   first output means provided on said movable body for outputting the characterizing features of the observed objects based upon the data read out of said memory.

2. The toy according to claim 1, wherein the data stored in said memory is audio data, and said first output means comprises a speaker for producing a sound corresponding to the audio data read out of said memory.

3. The toy according to claim 1, further comprising second output means, which is provided on said movable body and connected to said signal processing means via a drive circuit, for producing an indication in response to a signal from said signal processing means when said movable body arrives at a position opposing an observed object.

4. The toy according to claim 3, wherein said second output means comprises a lamp caused to flash in response to the signal from said signal processing means when said movable body arrives at a position opposing an observed object.

* * * * *